United States Patent [19]

Cleveland

[11] 4,161,000
[45] Jul. 10, 1979

[54] HIGH SPEED TELEVISION CAMERA CONTROL SYSTEM

[75] Inventor: Robert R. Cleveland, Kansas City, Mo.

[73] Assignee: Video Systems Research, Inc., Kansas City, Mo.

[21] Appl. No.: 846,433

[22] Filed: Oct. 28, 1977

[51] Int. Cl.² .................. H04N 5/30; H04N 7/18
[52] U.S. Cl. ........................... 358/225; 358/108; 358/217
[58] Field of Search .......... 358/4, 8, 54, 93, 148–150, 358/209, 214–217, 223, 225, 108, 250, 264, 267; 360/33, 73

[56] References Cited

U.S. PATENT DOCUMENTS

| 2,455,323 | 11/1948 | Townsend | 358/215 |
|---|---|---|---|
| 2,774,815 | 12/1956 | Gillette | 358/215 |
| 2,874,213 | 2/1959 | Beers | 358/215 |
| 2,956,117 | 10/1960 | Ernst et al. | 358/108 |
| 3,008,001 | 11/1961 | Reith | 358/83 |
| 3,113,180 | 12/1963 | Bingley et al. | 358/93 |
| 3,377,426 | 4/1968 | Thomas | 358/153 |
| 3,499,109 | 3/1970 | Kihara et al. | 358/225 |

*Primary Examiner*—John C. Martin
*Attorney, Agent, or Firm*—Schmidt, Johnson, Hovey & Williams

[57] ABSTRACT

A conventional television camera is provided with a motor driven, rotating mechanical shutter assembly having a pair of adjustable, opposing shutter openings, and control circuitry for synchronizing the operation of the shutter assembly with the scanning of the camera's pickup tube to limit image movement on the pickup tube during a field scan in order to permit high clarity picture reproduction of scene objects moving rapidly across the camera's field of view. The control circuitry is adapted to receive any of several types of conventional picture synchronizing signals ordinarily employed in television cameras and conditions these synchronizing signals for use in controlling a pair of motor driving amplifiers whose outputs are coupled to the shutter driving motor for selectively energizing the latter. The speed of the motor is therefore synchronized with the picture synchronizing signals, consequently, the angular position of the shutter openings remains synchronized with the scanning of the camera's pickup tube in spite of variations in the source of synchronizing signals, power line frequency or wear characteristics of the motor. An optical sensing circuit coupled with the shutter assembly functions to produce a tachometer signal indicative of the speed and phase position of the shutter openings and is used as a feedback control signal to automatically provide an initial phase adjustment of the motor in order to bring the operation of the shutter assembly into synchronization with the scanning of the camera's pickup tube. Protective circuitry is also provided for switching commercial line power to the motor in the event that the motor driving amplifiers are rendered inoperative, and for removing all energizing power from the motor in the event that the tachometer signal is not produced within a prescribed time interval after start-up of the system.

19 Claims, 5 Drawing Figures

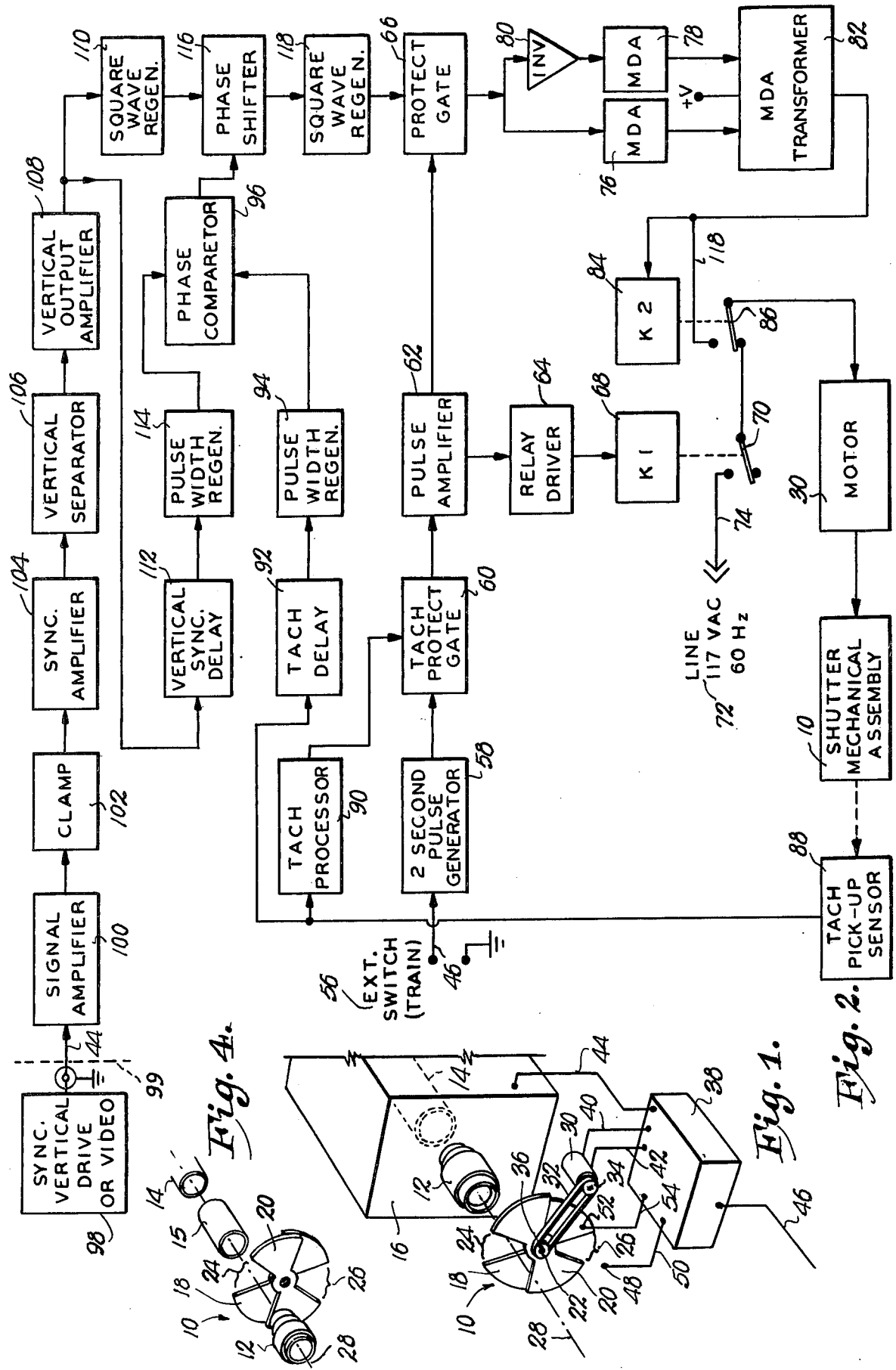

HIGH SPEED TELEVISION CAMERA CONTROL SYSTEM

BACKGROUND AND BRIEF DESCRIPTION OF THE INVENTION

This invention generally deals with television camera picture reproduction and deals more particularly with a system for synchronizing the operation of a lens shutter apparatus with ordinary synchronizing signals conventionally employed in television picture generation, to allow faithful, high clarity picture reproduction of scene objects traveling at relatively high rates of speed across the camera's field of view.

Television systems in the United States utilize a picture frame comprising 525 horizontal lines of image data interlaced to form a pair of superimposed picture fields, each field consisting of 262½ lines. Each field is scanned in 1/60 of a second so that a single picture frame (consisting of a pair of interlaced fields) is scanned in 1/30 of a second. Thus, the light of the scene object is successively focused on the camera's pickup tube for periods of 1/60 of a second. In the case of scene objects relatively distant from the camera's lens which are moving across the latter's field of view at relatively high rates of speed, movement of the image of the scene object focused on the pickup tube is minimal and a relatively clear picture of the scene object may be formed within the 1/60 of a second available for scanning. However, where the scene object is only a few feet away from the camera's lens and is traversing the latter's field of view at relatively high rates of speed, the movement of the image focused on the pickup tube is rather substantial within the 1/60 second interval, resulting in the reproduction of a blurred picture image. Heretofore, because of the above-mentioned deficiency, there has been minimal demand for televising scene objects moving rapidly across the camera's field of view, however, with the expanding role of television in commercial settings, a need has been created for high speed, television camera operation. One typical commercial application of television systems benefiting from the present invention involves the use of television cameras to visually "read" identification data imprinted on the sides of railroad cars. In this application, the camera is stationarily mounted immediately adjacent to the train of cars and transmits a televised image of the data associated with each car as the latter traverses the camera's field of view. The televised identification data is transmitted to a remote location and is used in sorting, spotting and scheduling the railroad cars. In the past, however, due to the operational limitations inherent in prior art conventional television cameras, the railroad cars were required to be drawn past the camera's field of view at very slow rates of speed, e.g. less than 10 miles per hour, thus requiring in many instances that the train be slowed to the required speed when passing the camera installation. With the aid of the present invention however, existing television cameras may be adapted to faithfully reproduce pictures of the identification data without a loss of clarity, with railroad cars moving at speeds in excess of 100 miles per hour. In fact, the present invention enables a conventional black and white or color television camera, for the first time, to reproduce clear pictures of proximal objects moving at speeds in excess of 200 miles per hour.

Conventional television cameras employ any of several types of signal timing circuits for synchronizing the scanning of the camera's pickup tube with the generation of television pictures, including: internal circuits having free-running or crystal controlled oscillators; external circuits driven by external sync-pulse generators; and, line-lock type circuits which include an internal oscillator that derives its time base from the frequency of an alternating current power source (typically 60 Hertz in the U.S.). In the past, others have attempted to improve picture clarity by adapting shutter apparatus for use with a television camera having timing circuitry of the line-locked type; the shutter apparatus was driven by an alternating current motor coupled with commercial electrical power service so that the shutter apparatus operated at approximately the same rate as the camera's picture generation system. The operation of this previous system was less than satisfactory since various factors, including mechanical error inherent in such a system, prevented precise synchronization of the shutter opening with pickup tube scanning, especially when high shutter speeds were required consequently, picture quality in these known prior systems were less than desired. In any event, none of the known prior attempts at providing a high speed television camera system have successfully employed cameras having internal or external timing circuits of the mentioned types.

The present invention overcomes the above discussed deficiencies inherent in prior art designs by providing a rotating shutter device disposed in the optical path of the pickup tube of a conventional television camera which is driven by an electronically controlled motor in synchronization with the scanning of the camera's pickup tube to successively expose the latter to scene objects for prescribed timed intervals in order to allow clear reproduction of fast moving objects by "stopping" the action of the latter. The invention is adapted for use with several common varieties of camera systems including power-line locked, externally synchronized, and internally synchronized types (employing free-running oscillators) all of which employ common synchronizing signals for generating television pictures. Control circuitry is provided for receiving the picture synchronizing signals and conditioning the same for use as motor driving signals. The motor driving signals are delivered to a pair of novel motor driving amplifiers whose energizing outputs are transformer coupled to the shutter motor and function to control the speed and phase of the latter in order to synchronize the operation of the shutter device with the scanning of the pickup tube to assure high clarity picture reproduction. A photodiode and a phototransistor cooperate with the shutter device to product a tachometer signal indicative of the speed and phase positioning of the shutter, which is fed back to the motor driving amplifiers to provide automatic, initial adjustment of the phase position of the shutter device after start-up of the system.

An important object of the invention is to provide unique apparatus and a novel method for selectively exposing one or more pickup tubes of a conventional television camara to fast moving scene objects in order to permit clear, accurate picture reproduction of the latter.

Another primary object of the invention is to provide a novel control circuit for detecting certain timing signals produced by a sync-pulse generator used in a conventional television system, and for conditioning the detected signals for use in controlling the operation of an electrical motor device in order to precisely synchronize the operation of the latter with the scanning operation in said television system.

A further object of the invention is to provide novel control circuitry for synchronizing the operation of shutter apparatus associated with the lens of an ordinary television camera with the scanning of the latter's pickup tube in order to insure coordinated cooperation of the scanning and exposure functions for television reproduction of high speed scene objects.

A still further object of the invention is to provide unique apparatus and circuitry of the type described which includes a shutter driving motor responsive to drive the shutter in accordance with the production of picture synchronizing signals, whereby to synchronize the operation of shutter apparatus with the scanning of the camera's pickup tube. As a corollary of the foregoing object, it is a further object to provide apparatus and circuitry of the mentioned type wherein tachometer means associated with the operation of the shutter apparatus is operative to produce a feedback control signal which is used for correcting the phase of the motor and the shutter apparatus.

Another object of the invention is to provide electronic control system circuitry which is operative to receive any of a number of conventional types of pictures scanning synchronizing signals and condition the received signals in accordance with the feedback control signal to produce the motor driving control signal for controlling the speed as well as phase of the motor and shutter apparatus. An object related to the foregoing object, is to provide means for comparing the phase of a feedback signal with that of the received synchronizing signal and correcting the phase of the latter in accordance with the phase of the former.

A further object of the present invention is to provide electronic control circuitry of the mentioned type which employs a pair of motor driving amplifiers respectively responsive to input control signals for transformer coupling energizing power to the shutter driving motor.

A still further object of the invention is to provide a novel method for eliminating the undesirable effects of image carryover between successively scanned picture fields in a conventional television camera due to image retentivity of the latter's image pickup tube.

Other and further objects of the invention will be made clear or become apparent in the course of the following description of a preferred embodiment of the invention.

DETAILED DESCRIPTION OF THE INVENTION

In the accompanying drawings:

FIG. 1 is an exploded, perspective view of a high speed television control system shown in operative relationship to an ordinary television camera and depicting a preferred arrangement of a rotating shutter assembly and optical components of the camera;

FIG. 2 is a partial block diagram of a preferred form of the invention;

Figure 3A:
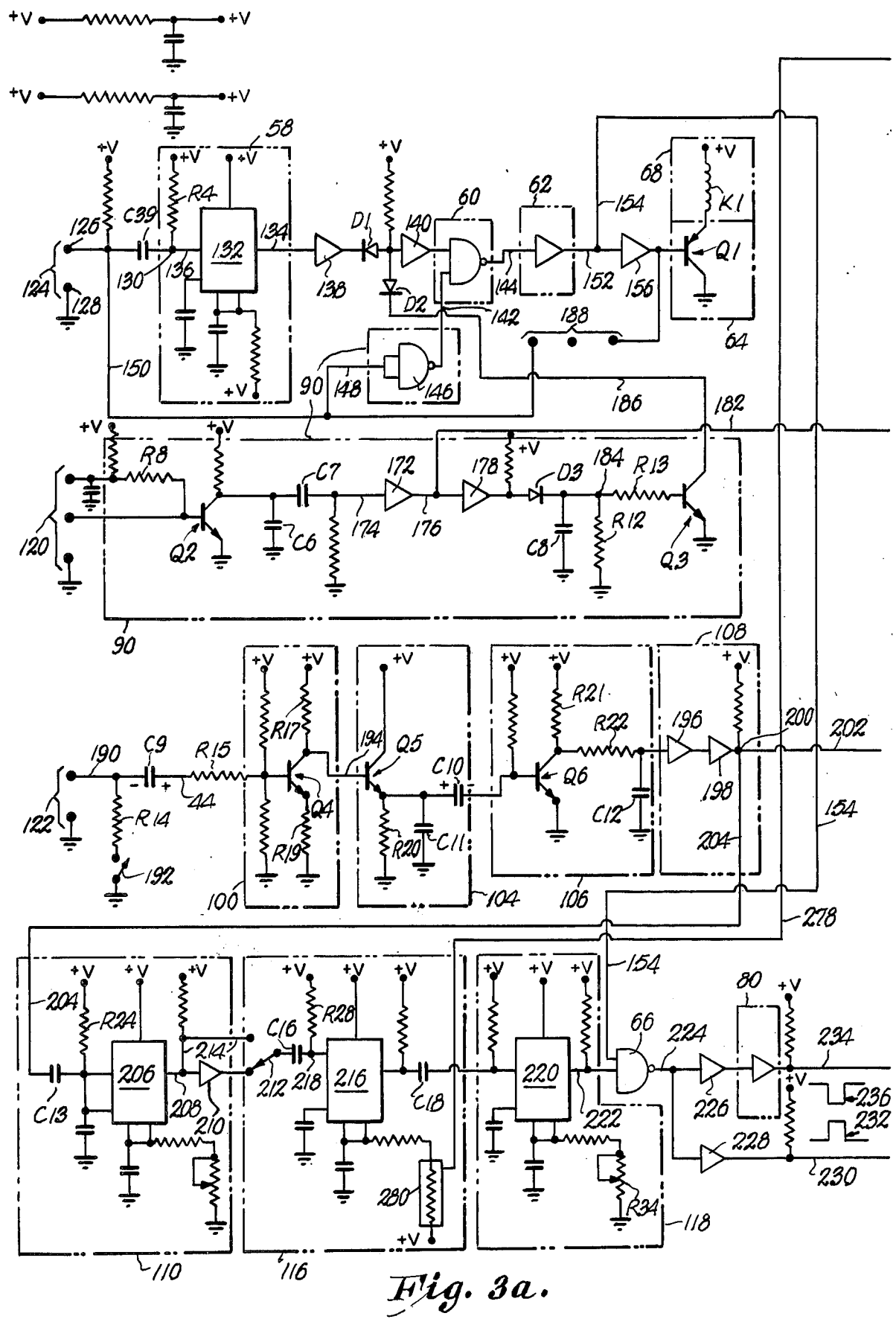
Figure 3B:
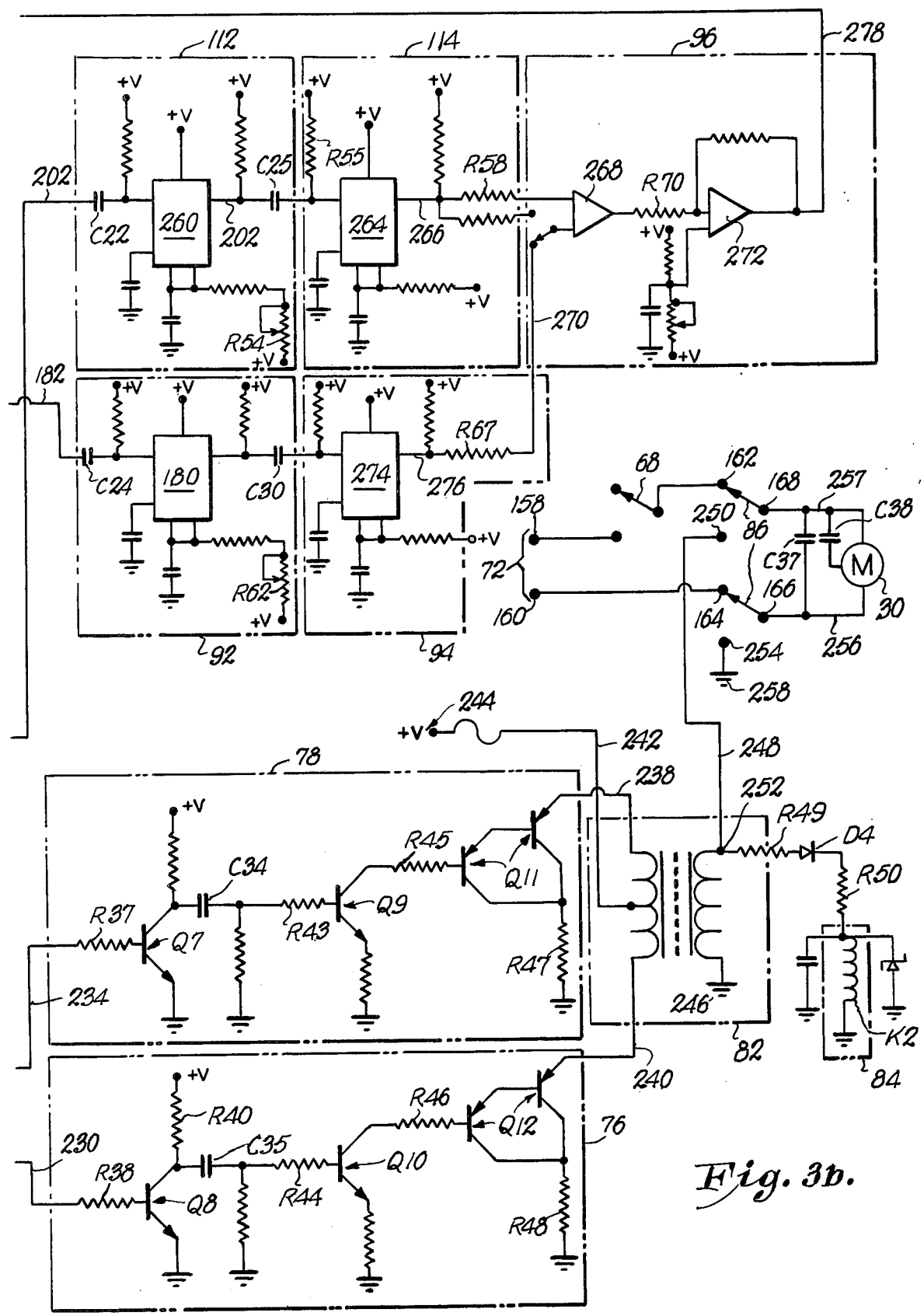

FIGS. 3a and 3b taken in conjunction, form a detailed schematic diagram of the electronic control circuit of the preferred form of the invention shown in FIG. 2; and FIG. 4 is an exploded, perspective view of an alternate arrangement of the shutter assembly and optical components of the camera.

Turning first to FIGS. 1 and 4, the invention includes a variable shutter assembly generally indicated by the numeral 10 interposed between a television camera lens 12 of an ordinary color or black and white television camera 16 and a scene to be televised, lens 12 being in optical communication with an image receiving signal plate, or "pickup tube" broadly designated by the numeral 14 associated with the camera 16. Alternatively, however, as shown in FIG. 4, the shutter assembly 10 may be interposed between the camera lens 12 and the pickup tube 14 in which case an adaptor lens 15 may be required to maintain proper optical focusing. In any event the shutter assembly 10 is of a known mechanical type, one useable type of such assembly being commercially available from the Red Lake Corporation and designated by the manufacturer's identification number 80-0018. Shutter assembly 10 comprises a first and second shutter plate 18 and 20 respectively, each being mounted for synchronous rotation on shaft 22, and being further selectively, manually rotatable relative to each other. Each of the plates 18 and 20 include a pair of opposing, pie-shaped blade segments difining an associated pair of segmented cut-out portions on each side of each of the blade segments, subtending an arc of approximately 90° with respect to an axis aligned with the shaft 22. With the plates 18 and 20 held in abutting relationship a pair of opposing, segmented openings comprising shutter openings 24 and 26 are presented between the adjacently oriented blades of the corresponding plates 18 and 20. It can be appreciated that as the plates 18 and 20 are rotated in opposite directions with respect to each other, the spacing of shutter openings 24 and 26 is varied and thus the shutter may be altered. Means (not shown) are provided for ordinarily yieldably biasing the plates 18 and 20 toward each other for maintaining fixed spacing of the shutter openings 24 and 26 and there is normally further provided graduated adjustment means (not shown) for varying the shutter speed (by altering the shutter spacing 24 and 26) from approximately 1/150 of a second to 1/10,000 of a second or greater. Lens 12 along with shutter assembly 10 are mounted by suitable means on the TV camera 16 in alignment with the optical axis indicated by the broken line 28, there being further provided suitable shroud structure (not shown) extending between the lens 12 and surrounding the shutter assembly 10, to provide light tight enclosure of the shutter assembly 10 with respect to the optical system of the camera 16.

The shutter assembly 10 is drivingly coupled for rotation with a suitable electrical motor 30 through a drive belt 32 trained around pulleys 34 and 36 respectively associated with motor 30 and shutter assembly 10. Shutter assembly speeds may be selectively changed by combinational changes of the diameter of pulleys 34 and 36 as well as the dimensional length of belt 32. Motor 30 is preferably of an alternating current, synchronous type capable of providing finely controlled shutter driving speeds. Electrical control circuitry generally designated by the numeral 38 is operably coupled by lines 40 and 42 to motor 30 and functions to control the speed and phase of the latter as will be discussed later in more detail. Any of a plurality of types of synchronizing signals are delivered to the control circuitry 38 from the TV camera 16 by line 44, while a further input to the control circuitry 38 formed by line 46 controls the actuation of control circuitry 38. A photodiode 48 of the known type, preferably emitting light in the infrared range is operably coupled to the control circuitry 38 by line 50 and is disposed on one side of the shutter assembly 10, 180° out of phase with the optical axis 28 with respect to the rotation of the shutter assembly 10. An ordinary phototransistor 52 connected by line 54 to control circuitry 38 is mounted by suitable means on the opposite side of the shutter assembly 10 and in optical alignment with photodiode 48 for receiving infrared light produced by the latter. From the foregoing, it is apparent that upon rotation of the shutter 10, the blade of the shutter plates 18 and 20 as well as the shutter openings 24 and 26 will successively pass through the optical path between photodiode 48 and phototransistor 52 to make and break the optical coupling between the latter mentioned electrical elements, to produce a pulsed tach (tachometer) signal correlatable with the rotational speed of the shutter 10 and further correlatable with the angular phase position of the shutter opening 24 or 26 which traverses the optical axis 28. As will become apparent hereinunder, novel control circuitry is provided to allow positioning one of the shutter openings 24 or 26 precisely in alignment with the optical axis 28 just prior to the commencement of scanning of each picture field in order to provide ordinary television reproduction of objects moving quickly across the camera's field of view. Normally then, the pickup tube 14 will be exposed once to the scene object each time a picture field is scanned, however, the apparatus and control circuitry are readily adaptable to provide selective exposure of the pickup tube 14 prior to the commencement of only certain, preselected, alternate ones of the successively scanned picture fields, and in this connection, the use of the apparatus and control circuitry provides a novel method of controlling television camera operation in certain applications where image carryover from one picture field to the next causes a "ghosting" effect which reduces contrast and clarity of televised picture image. The image carryover referred to above results from the fact that the pickup tube 14 retains an "electrical impression" of the optical image thereon after the exposure operation is complete and while this electrical impression normally remains only for a sufficient duration to allow scanning of the pickup tube to produce a single picture field, in some instances the electrical impression will remain at a relatively high signal strength for a prolonged period, rather than rapidly decaying after the scanning of the associated picture field, so that an electrical impression of an optical image associated with a previous field are present on the pickup tube during the exposure of the latter to scene objects during the production of a subsequent picture field; in these instances two sets of overlapping electrical impressions are present on the pickup tube, one set being of lesser signal intensity and corresponding to the "residue" or carryover image of a previous exposure and scanning operation, and another set of relatively high signal intensity and corresponding to the current image that is intended to be scanned. In order to eliminate the adverse effects of "image-carryover," it has been found that by timing the exposure operation such that the pickup tube 14 is exposed to the scene objects in coincidence with the scanning of only certain alternate ones of the successively scanned picture fields, but is optically blocked from such exposure during the scanning of the remaining picture fields, the image residue is allowed to completely decay from the pickup tube so that only a single high signal strength image is present on the pickup tube for scanning, the result being that only a single, high contrast, high clarity image is televised. Although some flicker is created in the resulting televised picture as a result of the effective scanning rate having been reduced, this impairment is inconsequential where image clarity is of paramount importance. The present apparatus and control circuitry may be simply adapted to accomplish the selective exposure operation described above by altering the speed at which the motor 30 is driven, or alternatively, by altering the size of the pulleys 34 and 36 in order to alter the speed at which the shutter assembly 10 is driven by its associated drive train.

Referring now also to FIG. 2, the electrical control circuitry 38 forms in combination with tachometer means comprising photodiode 48 and phototransistor 52, an electronic control system for controlling the speed and phase of motor 30, and thus the movement and phase position of the shutter assembly 10, in accordance with the synchronization and phase of control signals normally produced by the television camera 16 or conventionally provided circuitry associated therewith. In one typical application the camera 16 will be stationarily mounted in proximity to the object to be televised such as data imprinted on the sides of railroad cars which move past the camera 16. An enabling switch 56 remotely located from the camera 16 is actuated by an independent event such as the motion produced by the passing of a train. Upon actuation of switch 56, an enabling signal is delivered via line 46 to the control circuitry 38, and more particularly to a two second pulse generator 58 that delivers a two second pulse which is gated through tach protect gate 60, and is received at the input of pulse amplifier 62. Pulse amplifier 62 amplifies the two second pulse and delivers the same to the respective inputs of both relay driver 64 and protect gate 66. Upon receipt of the amplified two second pulse, relay driver 64 functions to supply electrical energy to the relay coil 68 thereby energizing the latter, and upon energization, relay coil 68 operates to close the normally open contacts of relay switch 70, thereby coupling the 117 volt commercial alternating current power source 72 with line 74. Recalling now that the amplified two second pulse produced by pulse amplifier 62 is delivered to one input of protect gate 66, and assuming now that a later discussed control signal is present at the other input of protect gate 66, a signal is gated through protect gate 66 and is simultaneously delivered to the input of a first motor drive amplifier 76 and to the input of a second motor drive amplifier 78 through an inverter 80 which inverts the character of the signal wave form delivered to motor drive amplifier 78, so that the signal present at the input of motor drive amplifier 76 is 180° out of electrical phase with the signal delivered to the input of motor drive amplifier 78. The outputs of the motor drive amplifier 76 and 78 are respectively delivered to the inputs of a motor drive amplifier transformer 82 which in turn is operative to energize the relay coil 84. Upon energization of the relay coil 84, the associated relay switch 86 is switched out of its series relationship with the relay switch 70, and into contact with line 118 thereby coupling the energizing output of transformer 82 with the input of motor 30 for energization of the latter. As motor 30 is energized and begins to rotate the shutter assembly 10, the shutter openings 24 and 26 in combination with the shutter blades corresponding to shutter plate 18 and 20 rotate through the beam of infrared light being delivered from photodiode 48 to phototransistor 52 to produce a tach signal that is picked up by the phototransistor 52 which acts, in combination with photodiode 48, as pick-up sensor 88. The detected tach signal is the simultaneously delivered to the input of a tach processor 90 as well as to the input of a tach delay 92. The tach processor circuitry 90 conditions the received tachometer signal and, assuming the character of the received tachometer signal indicates that the shutter assembly 10 is rotating, a conditioned signal is delivered to a second input of the tach protect gate 60 comparable in waveform characteristics with the signal delivered to first input thereof from the two second pulse generator 58. Assuming now that the entire two second pulse has been gated through tach protect gate 60, and that the shutter assembly 10 is rotating to produce the mentioned conditioned signal which is delivered to the second input of tach protect gate 60, the latter mentioned conditioned signal is delivered through gate 60 and pulse amplifier 62 to gate 66. With the continued presence of signals from pulse amplifier 62 at the input of gate 66, signals at the other input thereof are gated therethrough, and relay 84 remains energized to maintain the connection between transformer 82 and motor 30. If, however, shutter assembly 10 does not being to rotate within the required two second time interval, a tach signal fails to be generated by tach pick-up sensor 88, in which case tach processor 90 fails to deliver the conditioned signal to input to tach protect gate 60; in this event, the two second pulse having already been gated through tach protect gate 60, pulse amplifier 62 and protect gate 66 no longer receive actuating signals on their inputs, consequently relay coil 84 is deenergized and relay switch 86 resumes its normally open position, in series relationship with switch 70. However, in the absence of the tach signal, actuating signals also fail to be delivered from pulse amplifier 62 to the input of relay driver 64, consequently, relay 68 is deenergized and switch 70 resumes its open position so that all energizing power sources are uncoupled from the motor 30. From the foregoing, it is apparent that the tach signal produced by pick-up sensor 88 is continuously sampled in order to remove power from the motor 30 and turn off the motor drive amplifiers 76 and 78 in the event that the tach signal is not produced within two seconds of the initial start up of the system; by this feature of the invention the motor 30 is protected from overload as result of a mechanical blockage or freeze up of the shutter assembly 10 or drive linkage associated therewith. As a further safety feature of the invention, relay coil 84 and relay switch 86 function to sample the output of motor drive amplifier transformer 82, and in the event that the output of the latter transformer substantially diminishes, relay coil 84 is deenergized and relay switch 86 resumes its normally open position to place the power supply 72 in series with the motor 30; in this manner, the camera and shutter assembly will continue to function, although not in its optimal mode, due to a loss of synchronous timing between the camera scanning and the shutter assembly 10.

Assuming now that the shutter assembly 10 is rotating satisfactorily and a tach signal is being produced by pick-up sensor 88, the tach signal is delivered, as previously mentioned, to the input of tach delay 92. Tach delay 92 functions to adjust the pulse phase of the tach signal in accordance with the position of shutter assembly 10. The adjusted pulse is then delivered from tach delay 92 to the input of pulse width regenerator 94 which regenerates the adjusted pulse in order to produce a sharply defined, clean pulse. The regenerated tach pulse is delivered to one input of the phase comparator 96 whose function will be discussed infra.

A source of TV synchronizing signals 98, not an integral part of the control circuit as indicated by the broken line 99, is input via line 44 to the signal amplifier 100 which functions to invert and amplify the received signals to a usable level, the amplified synchronizing signals being then delivered to clamp circuit 102 which functions to amplify the most positive-going portion of the inverted signals in order to avoid unwanted signal components. The sync amplifier 104 is operative to amplify the synchronous components of the signals received from clamp circuit 102, and the amplified sync components are then delivered to the vertical separator 106 which functions to strip away the horizontal sync component, if present, leaving a vertical signal. The vertical signal received from vertical separator 106 is then amplified to a higher signal level by the vertical output amplifier 108, the resulting amplified vertical signal being delivered to the respective inputs of a square wave regenerator 110 and a vertical delay circuit 112. The pulse duration of the vertical signal produced from vertical output amplifier 108 is adjusted by vertical delay 112 in accordance with the duration of the tach signal output from tach delay 92, the resulting adjusted vertical signal being regenerated by the pulse width regenerator 114. The regenerated vertical pulse signal is then delivered to a second input of the phase comparator 96. Phase comparator 96 functions to compare the received pulses from the respective pulse width regenerators 94 and 114 and produces a direct current correction voltage which is then delivered to a secondary input of the phase shifter 116, a primary input to the phase shifter 116 being the vertical signal which has been amplified by vertical output amplifier 108 and subsequently regenerated by wave regenerator 110. Phase shifter 116 functions to shift the regenerated vertical signal in accordance with the feedback signal which is output from the phase comparator 96. The phase shifted signal produced by phase shifter 116 is delivered to square wave regenerator 118 which functions to produce a clean, 50% duty cycle signal which is then delivered to one input of protect gate 66, a second input to the latter being the enabling signal originating from the enabling switch 56. With signals present at both inputs of protect gate 66, the phase shifted synchronizing signal derived from square wave generator 118 is then delivered to the motor drive amplifier 76 and the motor drive amplifier 78 through the inverter 80 which functions to shift the signal delivered to motor drive amplifier 78 by 180°, as previously described. The outputs of motor drive amplifiers 76 and 78 function to control the input of transformer 82 such that a varying output voltage is delivered from transformer 82 via line 118 directly to the motor 30 in order to control the speed and phase of the latter. It is apparent at this point that the output voltage of transformer 82 which controls the speed and phase of motor 30 is determined by a phase adjusted input control signal which is derived from an external synchronizing signal provided by a source of TV synchronizing signals 98 and whose phase is adjusted in accordance with the positioning of shutter openings 24 and 26.

From the foregoing description it can be appreciated that the motor 30 is driven in synchronization with the synchronizing signals 98, and that as an additional feature of the invention, a feedback control loop has been provided for the twofold purpose of initially adjusting the phase of the motor 30 to automatically bring the operation of the shutter assembly 10 into synchronization with the scanning of the camera's pickup tube, as well as to protect the control system against damage in the event of system malfunction. It is to be noted however, that initial synchronization between the shutter assembly and the synchronizing signals 98 may be manually performed, without resort to the feedback control loop comprising tach pick-up sensor 88 and its associated circuitry, and in the absence of such feedback control loop, the control system performs entirely satisfactorily after the initial synchronization has been manually performed. In any event, it is important to note that a novel control circuit has been described for detecting certain timing signals conventionally employed in the scanning operation of a television system, and for conditioning the detected signals for use in controlling the operation of an ordinary electrical motor in order to precisely synchronize the operation of the latter with the scanning operation in the television system.

Turning now to the more detailed schematic drawings shown in FIGS. 3a and 3b, wherein the various sections of the circuitry enclosed within broken lines generally correspond to the functional blocks depicted in FIG. 2 and are designated by like reference numerals, tach signals produced by the tach pick up sensor 88 are delivered to the tach pickup input terminals 120 while a source of television synchronizing signals 98 are delivered to input terminals 122, and the external enabling switch 86 is connected to input terminals 124. Upon actuation of the enabling switch 56, terminal 126 is shorted to the grounded terminal 128 to produce a negative-going spike signal at the juncture 130 of capacitor C39 and resistor R4, which signal is delivered to the trigger input of timing chip 132. Chip 132 is a conventional timing circuit such as that manufactured by the Signetics Corporation and identified by the manufacturer's identification number NE 555. In the present application, chip 132 is employed as a pulse generator and functions to deliver a positive, two second pulse signal on line 134 upon receipt of the above mentioned negative-going spike signal on its input via line 136. The two second pulse on line 134 is delivered to the input of inverting amplifier 138, the resulting positive pulse output thereof then being delivered through diode D1 to the input of inverter 140. The positive or "high" two second pulse output of inverter 140 is delivered to one input of the tach protect gate 60 which comprises an ordinary NAND gate, a second input to said gate being formed by line 142. Line 142 is connected to the NAND gate 146 whose inputs are respectively coupled by lines 148 and 150 to terminal 126, thus upon the shorting together of terminals 126 and 128, a low signal produced on lines 148 and 150 will result in the output of NAND gate 146 being high, which high signal is delivered via line 142 to the other input of gate 60. With both inputs of gate 60 held high, the output thereof goes low for a two second interval, and the resulting low output pulse is inverted and delivered by line 152 to one input of protect gate 66 as well as to the base of transistor Q1 after having been inverted to a low signal by the inverter 156.

Transistor Q1 has the collector thereof grounded while the emitter thereof is coupled to the relay coil K1 which is associated with the relay switch 68. Upon receipt of the two second low pulse at the base of transistor Q1, the latter is turned on and functions to energize coil K1. Energization of coil K1 causes its associated switch 68 to switch from its normally open position to a closed position, thereby connecting a suitable source of electric power 72 (connected to terminals 158 and 160) across the contacts 162 and 164 associated with the relay switch means 86. Motor 30 has its energizing input terminals coupled by capacitor C38, and lines 256 and 257 to the contacts 166 and 168, thus it is apparent that upon closure of switch 68 the electrical power source 72 is placed in a series circuit with motor 30, and results in energization of the latter.

As motor 30 is energized, shutter assembly 10 rotates and the resulting tach signal derived from tach pick up sensor 88 is delivered to the base of transistor Q2. The emitter of transistor Q2 is grounded, while the collector thereof is respectively decoupled to ground by capacitor C6 and capacitively coupled to the input of the inverter 172 by line 174 and capacitor C7. Upon receipt of tach signals at the base of transistor Q2, the latter is turned on to conduct, and the resulting output signals produced by transistor Q2 are delivered through capacitor C7 to the inverter 172, the resulting output signals being delivered by line 176 to both the input of amplifying inverter 178 as well as to the input of chip 180 via line 182. The output of amplifying inverter 178 is connected in series with diode D3 to the base of transistor Q3 through resistor R13 as well as to ground through the capacitor C8. The output signal produced by amplifying inverter 178 is rectified by diode D3 and filtered by capacitor C8, and results in the production of a positive DC voltage at the juncture 184 of resistor R12 and R13. Transistor Q3 has the emitter thereof connected to ground while the collector of same is connected by line 186 through diode D2 to the input of inverter 140. Thus, the positive DC voltage at juncture 184 functions to turn on the transistor Q3 bringing the collector low, and therefore line 186, low. The low on line 186 functions to forwardly bias the diode D2, which in turn results in maintaining the input of inverter 140 also low (thereby maintaining the coil K1 in its energized state), even after the two second positive pulse has been produced by timer chip 132. From the foregoing then, it is apparent that in the event that a tach signal is not received at input terminal 120 resulting in the required low signal being delivered on line 186, coil K1 will be deenergized whereupon relay switch 68 will be opened to remove the power supply 72 from the motor 30, and the latter will be deenergized. It is noted here in passing, that the terminals indicated by the numeral 188 are simply provided for testing and trouble shooting purposes.

Turning attention now to the electronic processing of the TV synchronizing signals, the source of TV synchronizing signals 98 is coupled with terminals 122, which are in turn capacitively coupled by capacitor C9 through resistor R15 to the base of transistor Q4, which transistor, whose emitter and collector are respectively coupled to ground and the base of transistor of base Q5, comprises the signal amplifier 100. The signal delivered to terminals 122 may comprise either a vertical drive signal, a composite sync signal, or the video signal from an associated television video camera. In order to accomodate these various types of input signals, a resistor R14 may be selectively coupled between line 190 and ground by means of the switch 192 in order to selectively terminate the input signals into a 75 ohm load or alternatively, into a loop-through input. Upon receipt of synchronizing signals at the base of transistor Q4, the latter is turned on and delivers an output signal on line 194 to the base of transistor Q5. The output signal at the emitter of transistor Q5 varies in accordance with the voltage present on line 194 and is capacitively coupled by capacitor C10 to the base of transistor Q6. Capacitor C11 is connected between ground and the emitter of transistor Q5 and functions to filter the outgoing signal of any chrominance or other high frequencies, capacitor C11 forming in combination with capacitor C10 and resistor R20 as well as transistor Q5, the previously mentioned sync amplifier 104. Transistor Q6, which comprises the previously mentioned vertical separator 106, has the emitter thereof grounded while its collector is connected to resistor R21 and to the input of inverter 196 through resistor R22. The collector output of transistor Q6 follows the emitter output of transistor Q5, and is thus biased in a manner to amplify only the most positive part of the synchronizing signal. Resistor R22 and capacitor C12 function as a filter circuit means to remove the horizontal sync component of the collector output of transistor Q6, so that the resultant signal delivered to the input of inverter 196 is a vertical component. The vertical signal is inverted by inverter 196 and is then delivered to the input of amplifying inverter 198 which again inverts the vertical signal, so that the output signal present at juncture 200 comprises a plurality of negative going pulses which provide a reference signal for the control system. The reference signal control output from the vertical output amplifier 108 which comprises the inverter 196 and inverting amplifier 198, is delivered on line 202 to the input of vertical delay 112, and is also delivered to the input of square wave regenerator 110 via line 204. Square wave regenerator 110 comprises a timer chip 206, essentially similar to chip 132, and has its trigger input capacitively coupled by capacitor C13 to receive input signals via line 204. The signal present on line 204 is converted by capacitor C13 and resistor R24 into a negative-going spike at the input of chip 206. The output of chip 206 on line 208 may be selectively delivered to the phase shifter 116 directly across the lines 214 or alternatively through the inverter 210 by means of the selectively operable switch 212. The phase shifter 116 comprises a timer chip 216, similar to the timer chip 132, and has the trigger input thereof capacitively coupled to the output of chip 206 as well as to the resistor R28, while the output thereof is capacitively coupled by means of capacitor C18 to the input of square wave regenerator 118. The output of chip 206 is delivered via line 208 through the capacitor C16 which creates a negative transition of the signal which is then delivered to the input of chip 216. The output of chip 216 is delivered through capacitor C18 to the trigger input of timer chip 220, which is essentially identical in character to chip 132. Chip 220 comprises the square wave regenerator 118 and is provided with variable resistor R34 to allow adjustment of the duty cycle of the signal output on line 222. The output signal from chip 220 is delivered via line 222 to one input of the protect gate 66 which comprises an ordinary NAND gate, a second input to gate 66 being formed by line 154 which in turn is connected to the output of pulse amplifier 62. Thus, it is apparent that the output of gate 66 on line 224 remains high until such time as a high signal is produced on line 154 as a result of the enabling switch 56 having been actuated. Upon actuation of the enabling switch 56 line 154 goes high, and with a high signal present on line 222, the output of gate 66 on line 224 goes low, which low signal is respectively delivered to the input of inverter 226 and amplifying inverter 228. Amplifying inverter 228 inverts the low going square wave received thereat and produces on its output line 230 a square wave generally indicated by the arrow 232. Inverter 226 likewise inverts the square wave received, which is then delivered to the input of inverter 80. Inverter 80 is an amplifying inverter and functions to reinvert the received square wave so that the output on line 234 comprises a square wave generally indicated by the arrow 236 which can be seen to be 180° out of phase with the wave form 232. The square wave on line 234 is delivered to the input of motor drive amplifier 78, while the 180 degree square wave signal on line 230 is delivered to the input of motor drive amplifier 76.

Motor drive amplifier 78 comprises transistors Q7 and Q9 connected in the common emitter configuration which are coupled through resistor R45 to the Darlington connected transistor pair Q11, the emitter output of transistor pair Q11 being coupled by line 238 to one primary input to transformer 82. Motor drive amplifier 76 is configured essentially identical to that of motor drive amplifiers 78 and includes transistors Q8 and Q10 connected together in the common emitter configuration, the collector output of transistor Q10 being connected via resistor R46 to the input of the Darlington transistor pair Q12, the emitter output of transistor pair Q12 being connected by line 240 to the other primary input to transformer 82. Thus, it can be appreciated that motor drive amplifiers 76 and 78 are respectively coupled to the input of transformer 82 in a pull-pull fashion. The negative going square wave delivered on line 234 is amplified by transistor Q7 and is AC coupled by means of capacitor C34 to the base of transistor Q9, through resistor R43. Transistor Q9 then functions to amplify the received negative-going square wave, and delivers the same to the input of the Darlington pair Q11. Upon receipt of the negative-going amplified square wave at the input of Darlington pair Q11, the latter are responsive to conduct and deliver an emitter signal on line 238. Similarly, the square wave on line 230 is delivered to the base of transistor Q8, the resulting collector output being capacitively coupled by means of capacitors C35 to the base of transistor Q10 through resistor R44. The resulting collector output of transistor Q10 is delivered through resistor R46 to the input of the Darlington Q12, whereupon the latter function to conduct and deliver an emitter signal on line 240. Transformer 82 is of the conventional type and has a center primary tap input which is connected by line 242 to a fused, direct current voltage source generally indicated by the arrow 244. One side of the secondary output of transformer 82 is connected to the ground 246 while the other secondary side thereof is connected via line 248 to switch terminal 250 as well as to the relay coil 84 through resistor R49 diode D4 and resistor R50. As the primary side of transformer 82 is driven by motor drive amplifier 76 and 78, an alternating current drive signal is produced at juncture 252 which is then delivered both to the relay coil 84 to energize the latter, as well as to the switch terminal 250. Upon energization of relay coil 84 relay switch 86 respectively switch from contact 162 to contact 250, and from contact 164 to contact 254. With relay switch 86 in its switched position, the alternating current signal present on line 248 is then delivered through contacts 250 and 168 to one side of the motor 30, the opposite side of the latter being grounded through line 256 and contacts 166, and 254 to the ground 258. At this point, it is clear that the motor 30 is energized by means of transformer 82 and is controlled in accordance with the respective outputs of motor drive amplifiers 76 and 78. However, in the event that motor drive amplifers 76 and 78 fail to produce output driving signals, as would be the case when the external switch 56 fails to be actuated, or alternatively in the event that a tach signal is not detected by pick up sensor 88, relay switches 86 remain in the condition depicted in FIG. 3b, and motor 30 remains uncoupled from transformer 82.

The vertical delay circuit 112 comprises a timer chip 260, which is essentially identical in internal circuit configuration to the chip 132, and has its trigger input capacitively coupled by capacitor C22 and line 202 to the output of vertical output amplifier 108, while the output thereof on line 202 is capacitively coupled by capacitor C25 to the trigger input of chip 264, there being further provided a variable resistor R54 connected to timing inputs of chip 260 in order to allow adjustment of the pulse width delivered by chip 260 on output line 202. Timer chip 264 is likewise similar in internal electrical configuration to the chip 132 and functions as a monostable multi-vibrator to deliver a series of pulses on line 266 through resistor R58 to one input of the differential amplifier 268, a second input to differential amplifier 268 being formed by line 270 which is connected to a later discussed pulse width regenerator 94. The output of differential amplifier 268 is connected via resistor R70 to the input of operational amplifier 272, the combination of amplifiers 268 and 272 forming the previously discussed phase comparator 96.

As previously mentioned the conditioned tach signal delivered at the output of inverter 172 is delivered via lines 176 and 182 to the input of tach delay 92. Tach delay 92 comprises a timer chip 180 similar in internal configuration to the chip 132 and has its trigger input capacitively coupled by capacitor C24 to line 182 while the output thereof is capacitively coupled by capacitors C30 to the trigger input of timer chip 274, there being further provided a variable resistor R62 connected with the timing inputs of chip 180 in order to selectively vary the pulse duration of the output signal produced by chip 180. The pulse width regenerator 94 comprises chip 274 which is essentially identical to the chip 180 and functions to regenerate and more sharply define the signal output by chip 180, the resulting regenerated pulse being delivered on output line 276 through resistor R67 and line 270 to the other input of differential amplifier 268. Differential amplifier 268 functions to compare the relative voltage levels present on its two mentioned inputs and produces an output signal comprising a DC voltage having a direct relationship to the phase differences of the vertical drive signal derived from the pulse width regenerator 114 and the tach pulse signal derived on line 270 from the pulse width regenerator 94. The direct current voltage signal output by differential amplifier 268 is inverted by the operational amplifier 272, the resulting inverted direct current voltage signal being delivered on line 278 to the phase shifter 116, and more particularly to the voltage controlled resistor 280. The resistance through voltage controlled resistor 280 varies in accordance with the voltage received on control line 278, the resultant changes in resistance of resistor of resistor 280 in turn altering the operation of chip 216 such that the phase of the output pulse delivered to chip 220 is likewise altered.

Thus, it can be appreciated that the phase of the respective square waves on lines 230 and 234 controlling the operation of the respectively associated motor drive amplifiers 76 and 78 are altered in accordance with the phase of the tach signal detected by pickup sensor 88 so that the rotation of motor 30 (and therefore the angular position of shutter assembly 10) is synchronized with the scanning synchronization signals produced by the internal circuitry of the TV camera 16.

From the foregoing, it is clear that the invention provides especially effective means for adapting various types of conventional television cameras for high speed operation and does so in a manner to assure reliable operation of the camera system. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

I claim:

1. In combination with a conventional television camera system of the type operably associated with an electrically produced time base reference and including electrical circuitry coupled with said time base reference for generating conventional picture synchronizing signals normally employed for controlling television picture reproduction, a control system for adapting said camera system to reproduce high clarity pictures of rapidly moving scene objects, including:

shutter means adapted to be coupled with said camera system for selectively exposing image receiving portions of the latter to images of said scene objects for prescribed time intervals, said shutter means including shutter structure having a shutter opening therein, said shutter structure being mounted for rotation to allow said shutter opening to successively traverse an optical path between the image of said scene objects and said camera's image receiving portions whereby to expose the latter to the former, said shutter structure including a pair of superimposed, abutting shutter plates, each of said plates including a pair of opposing shutter blades and having a pair of opposing, cut-out portions between said blades, each of the cut-out portions of one of said plates cooperating with the respective cut-out portions of the other of said plates to define a pair of opposing shutter openings, there being yieldable biasing means operably coupled with said plates for normally holding the latter in constant relationship to each other, but yieldable to permit shifting of said plates relative to each other for adjusting said shutter openings;

controllable motor means operably coupled with said shutter means for operating the latter to expose said camera's image receiving portions, said motor means being drivingly coupled with said shutter structure for causing the latter to rotate;

electronic control circuit means operably coupled with said motor means and adapted to be coupled with said camera system for receiving said synchronizing signals, said circuit means being operative for controlling the operation of said motor means in accordance with said synchronizing signals whereby to synchronize the operation of said shutter means with said picture reproduction, said circuit means including detecting circuitry for receiving said synchronizing signals associated with said television picture reproduction and for operating on said synchronizing signals to derive a series of electrical timing pulses each respectively associated with the commencement of reproduction of a picture field by said camera system, and amplifying means operably coupled with said detecting circuitry and with said controllable motor means, said amplifying means being operative to receive said timing pulses and amplify the latter to produce synchronized power signals for delivery to said controllable motor means for energization of the latter, the operating speed of said controllable motor means being controlled by said synchronized power signals for operating said shutter means whereby to cause said shutter opening to be positioned in registration with said optical path upon the commencement of reproduction of each of said picture fields;

tachometer means operably associated with said shutter means for producing an electrical feedback signal indicative of the rotational speed and position of said shutter opening;

comparator circuit means operably coupled with said control circuit means and with said tachometer means for comparing the phase of said synchronizing signals with the phase of said feedback signals, said comparator circuit means being further operative to detect the phase difference between the compared signals and to produce a correction signal corresponding to said phase difference therebetween; and phase shifting circuit means operably coupled with said detecting circuitry, with said amplifying means, and with said comparator circuit means, said phase shifting circuit means being responsive to the receipt of said correction signal for shifting the phase of said electrical timing pulses delivered to said amplifying means and thereby alter the speed of said controllable motor means in order to synchronize the rotational position of said shutter opening with the commencement of reproduction of a picture field by said camera system.

2. The invention of claim 1, further including:

actuatable switch means for actuating said control system;

electrical pulse generation means having its input operably coupled with said actuatable switch means, and being operative to produce an actuating pulse having a prescribed duration at its output upon actuation of said switch means; and electrical gating means having inputs thereto operably coupled with said tachometer means, with said output of said pulse generation means, and with said detecting circuitry, the output of said gating means being operably coupled with said amplifying means, said gating means being responsive to the receipt of said actuating pulse for selectively gating electrical pulses therethrough to initially energize said motor means for rotation of said shutter structure.

3. The invention of claim 2 wherein said gating means comprises:

first gate means having its inputs operably coupled with said tachometer means and with said output of said pulse generation means, and second gate means having its inputs operably coupled with said detection circuitry and with the output of said first gate means, the output of said second gate means being operably coupled with said amplifying means, there being further provided— first actuatable switching means operably coupled with said first gate means and under control of the latter, and being adapted to be operably coupled with a source of electrical power, and second actuatable switching means operably coupled with said amplifying means and under control of the latter, and being further operably coupled with said motor means, said second actuatable switching means being actuated in response to electrical pulsed gated through said second gate means and operative to selectively couple said motor means with said amplifying means or with said first actuatable switching means, said first actuatable switching means being actuated in response to electrical pulses gated through said first gate means and operative to selectively couple said source of electrical power with said second actuatable switching means, said first and second actuatable switching means being cooperatively operable to couple said motor means with said source of electrical power upon failure of said amplifying means to deliver said power signals to said motor means, and being further cooperably operable for uncoupling said motor means from source of electrical power and from said amplifying means upon failure of said tachometer means to produce said feedback signal.

4. In combination with a conventional television camera system of the type operably associated with an electrically produced time base reference and including electrical circuitry coupled with said time base reference for generating conventional picture synchronizing signals normally employed for controlling television picture reproduction, a control system for adapting said camera system to reproduce high clarity pictures of rapidly moving scene objects, including:

shutter means adapted to be coupled with said camera system for selectively exposing image receiving portions of the latter to images of said scene objects for prescribed time intervals, said shutter means including shutter structure having a shutter opening therein, said shutter structure being mounted for rotation to allow said shutter opening to successively traverse an optical path between the image of said scene objects and said camera's image receiving portions whereby to expose the latter to the former, said shutter structure including a pair of superimposed, abutting shutter plates, each of said plates including a pair of opposing shutter blades and having a pair of opposing, cut-out portions between said blades, each of the cut-out portions of one of said plates cooperating with the respective cut-out portions of the other of said plates to define a pair of opposing shutter openings, there being yieldable biasing means operably coupled with said plates for normally holding the latter in constant relationship to each other, but yieldable to permit shifting of said plates relative to each other for adjusting said shutter openings;

controllable motor means operably coupled with said shutter means for operating the latter to expose said camera's image receiving portions, said motor means being drivingly coupled with said shutter structure for causing the latter to rotate;

electronic control circuit means operably coupled with said motor means and adapted to be coupled with said camera system for receiving said synchronizing signals, said circuit means being operative for controlling the operation of said motor means in accordance with said synchronizing signals whereby to synchronize the operation of said shutter means with said picture reproduction, said circuit means including detecting circuitry for receiving said synchronizing signals associated with said television picture reproduction and for operating on said synchronizing signals to derive a series of electrical timing pulses each respectively associated with the commencement of reproduction of a picture field by said camera system, and amplifying means operably coupled with said detecting circuitry and with said controllable motor means, said amplifying means being operative to receive said timing pulses and amplify the latter to produce synchronized power signals for delivery to said controllable motor means for energization of the latter, the operating speed of said controllable motor means being controlled by said synchronized power signals for operating said shutter means whereby to cause said shutter opening to be positioned in registration with said optical path upon the commencement of reproduction of each of said picture fields, said amplifying means including a pair of amplification circuits each having an output section and having an input section operably coupled with said detecting circuitry;

inverting means operably coupled with the input section of one of said amplification circuits and with said detecting circuitry for inverting said timing pulses prior to delivery of the latter to said one amplification means; and transformer coupling means provided with a pair of primary inputs respectively operably coupled with said amplification circuits and being further provided with a pair of secondary outputs operably coupled with said motor means, said amplification circuits cooperatively operating in a pull-pull mode to produce said power signals at the respective output sections thereof, said transformer coupling means being operative for coupling said power signals with said motor means.

5. A television camera system for generating high clarity pictures of rapidly moving scene objects, including:

a television camera having an optical system including an image receiving lens, an image target area in optical communication with said lens for receiving an image of a scene object thereon and adapted to be scanned for converting said image to corresponding electrical signals used in generating successive picture fields, and controllable scanning means for scanning said image target area;

means for generating synchronizing timing signals used for controlling said controllable scanning means, said generating means being operably coupled with said controllable scanning means and being adapted for coupling with electrical time base reference means;

controllable shutter means operably associated with said optical system and being operative for successively exposing said target area to said scene object image for prescribed time intervals;

control means operably coupled with said generating means and with said shutter for controlling the latter, said control means including circuit means responsive to said timing signals for controlling the operation of said shutter means whereby to synchronize the exposure operation of the latter with the scanning of said image target area, said control means including motor means operably coupled with said control circuit means and with said shutter means for controlling the operation of the latter;

filter circuit means operably coupled with said control circuit means for selectively filtering said timing signals to produce a train of timing pulses, each of said pulses being respectively associated with the scanning of successively generated television picture fields;

motor driving circuit means operably coupled with said filter circuit means for receiving said pulse train from the latter, and being further operably coupled with said motor means, said driving circuit means being operative to condition each of said received timing pulses and to convert the latter to energizing power signals for delivery to said motor means for energizing the latter to control the operation of said shutter means, said energizing power signals having cyclical timing characteristics synchronized with said timing signals and functioning to provide synchronized operation of said motor means whereby to allow synchronized control of said shutter means;

sensing means operably associated with said shutter means for sensing the operational condition of the latter and being operative to produce feedback control signals corresponding to said sensed condition; and feedback circuit means operably coupled with said sensing means and with said control circuit means, for delivering said feedback control signal to the latter, said control circuit means further including correction circuitry responsive to said feedback control signals for altering the timing of said pulse train delivered to said motor driving circuit means whereby to cause said motor means to bring said shutter means into synchronized operation with said scanning of said image target area.

6. The invention of claim 5, wherein:

said sensing means includes tachometer means for producing said feedback control signals, said feedback control signal including signal components indicative of the operational speed and phase position of said shutter means, said correction circuitry including comparator circuit means operably coupled with said tachometer means, and with said filter circuit means, and being operative for comparing the phase of said train of timing pulses with the phase of said feedback control signal components, said comparator circuit means being further operative to detect the phase difference of the compared signals and to produce correction signals corresponding to said phase difference, and phase shifting circuit means operably coupled with said comparator circuit means, with said filter circuit means, and with said motor driving circuit means, said phase shifting circuit means being responsive to the receipt of said correction signals from said comparator circuit means for shifting the phase of said pulses in said train thereof.

7. The invention of claim 5, wherein said driving circuit means comprises:

a pair of amplification circuits each having an input section operably coupled with said filter circuit means for receiving said pulse train from the latter, and each being further provided with an output section and coupling circuit means operably coupled with said motor means and with the respective outputs of said amplification circuits, and cooperatively operable with the latter to deliver said energizing power signals to said motor means.

8. The invention of claim 7, wherein each of said amplification circuits comprises:

a first pair of capacitively coupled transistor devices, the base electrode of one of said pair providing said input section, and a second pair of Darlington connected transistor devices said second pair of devices being operably coupled with said first pair thereof, one electrode of one of said devices of said second pair thereof providing said output section.

9. A method for producing high clarity pictures of rapidly moving scene objects using a television camera employing electronically produced timing signals derived from an electrical time base reference for controlling scanning of successive picture fields during normal television picture reproduction, including the steps of:

selectively exposing the camera's image receiving means to said scene objects for prescribed time intervals, including the sub-steps of driving a shutter device associated with said camera, and passing a shutter opening through the optical path between said camera's image receiving means and said scene objects, as said shutter device is driven;

sensing at least certain of said timing signals; and synchronizing the exposure of said image receiving area with said sensed timing signals whereby to expose said image receiving area prior to commencement of scanning of each of said picture fields, including the sub-step of controlling the exposure of said camera's image receiving means in accordance with said sensed timing signals by amplifying said sensed timing signals, and regulating the driving of said shutter device in accordance with said amplified, sensed timing signals;

sensing the position of said shutter opening;

producing feedback signals indicative of the sensed position of said shutter opening;

comparing said sensed timing signals with said feedback signals; and conditioning said sensed timing signals in accordance with the results of said signal comparing step, whereby to maintain the position of said shutter opening in synchronization with said timing signals.

10. The invention of claim 9 wherein the shutter shifting step includes rotating a pair of shutter openings through said optical path to produce successive exposure of said camera's image receiving means to said scene objects.

11. The invention of claim 9, wherein the signal sensing step includes the sub-steps of:

receiving composite video signals associated with said timing signals, and detecting the vertical component pulses in said composite video signals.

12. The invention of claim 9, including the step of:

exposing said camera's image pickup tube to said scene objects for prescribed time intervals prior to commencement of scanning of only certain selected ones of said picture fields.

13. The invention of claim 9, wherein the exposing step includes the sub-steps of:

placing said camera's image pickup tube in optical communication with said scene objects for a prescribed time interval prior to the commencement of scanning of a first picture field;

then, blocking the optical path between said pickup tube and said scene objects during the scanning of said first picture field, said blocking step being continued during the scanning of a prescribed number of picture fields following said scanning of said first picture field to allow fade-out of the image on said pickup tube corresponding to said first picture field;

then, again placing said camera's image pickup tube in optical communication with said scene objects for a prescribed time interval prior to commencement of scanning of a picture field following said prescribed number thereof; and successively repeating the steps of placing the camera's image pickup tube in optical communication with said scene objects, and blocking said optical path.

14. An electrical circuit for controlling the operation of an electrical motor device in accordance with timing signals of the type produced by a sync-pulse generator used in a conventional television system for controlling picture image scanning, including:

detection circuit means adapted to be operably coupled with a source of said timing signals for receiving said timing signals from the latter, and operative to detect at least certain periodically recurring ones of said received timing signals comprising a train of picture synchronizing pulses each respectively associated with the commencement of scanning of a picture field by said television system, said coupling of said source with said detection circuit means including amplifier means for receiving said timing signals from said source and amplifying at least portions thereof prior to detection thereof by said filter circuit means, said detection circuit means including filter circuit means for selectively filtering said timing signals to detect said train of synchronizing pulses;

amplifying means adapted to be operably coupled with said motor device and operably coupled with said detection circuit means, said amplifying means being operative to receive said train of synchronizing pulses and including amplification circuit means for amplifying each of the latter to produce synchronized power signals for delivery to said motor device for energizing the latter to operate, the operating condition of said motor device being controlled in accordance with the frequency of said train of synchronizing pulses, said amplification circuit means including a pair of amplification circuits each having an output section and an input section operably coupled with said detection circuit means;

inverter means operably coupled between the input section of one of said amplification circuits and said detection circuit means, for inverting the phase of each of said pulses in said train thereof prior to delivery of the latter to said input section of said one amplification circuit, said amplification circuits cooperatively operating in a pull-pull mode to produce alternating energizing signals at the respective ones of said output sections thereof; and coupling circuit means adapted to be operably coupled with said motor device and operably coupled with each of said amplification circuit output sections for delivering said alternating energizing signals from each of the latter to said motor device.

15. The invention of claim 14 wherein each of said amplification circuits comprises:

a first pair of transistor devices capacitively coupled with each other, the base electrode of one device of said pair thereof providing said input section, and a second pair of transistor devices coupled with each other in a Darlington configuration, said second pair of said devices being operably coupled with said first pair thereof, one electrode of one of said devices of said second pair thereof providing said output section.

16. An electrical circuit for controlling the operation of an electrical motor device in accordance with timing signals of the type produced by a sync-pulse generator used in a conventional television system for controlling picture image scanning, including:

detection circuit means adapted to be operably coupled with a source of said timing signals for receiving said timing signals from the latter, and operative to detect at least certain periodically recurring ones of said received timing signals comprising a train of picture synchronizing pulses each respectively associated with the commencement of scanning of a picture field by said television system, said detection circuit means including filter circuit means for selectively filtering said timing signals to detect said train of synchronizing pulses;

amplifying means adapted to be operably coupled with said motor device and operably coupled with said detection circuit means, said amplifying means being operative to receive said train of synchronizing pulses and including amplification circuit means for amplifying each of the latter to produce synchronized power signals for delivery to said rotor device for energizing the latter to operate, the operating condition of said motor device being controlled in accordance with the frequency of said train of synchronizing pulses, correction circuit means operably coupled with said detection circuit means for operating on said synchronizing pulse train;

sensing means operably associated with said motor device for sensing said operating condition of the latter, and being operative to produce control signals corresponding to said sensed condition; and feedback circuit means operably coupled between said sensing means and said correction circuit means for delivering said control signals to the latter, said correction circuit means being responsive to the receipt of said control signals for altering the timing characteristics of said pulse train prior to delivery of the latter to said amplifying means whereby to cause the latter to bring said motor device into synchronized operation with the scanning operation of said television system.

17. The invention of claim 16, wherein:

said sensing means includes tachometer means for producing said control signals, said control signals including signal components indicative of the operational speed and phase position of said motor device, said correction circuit means including comparator circuit means operably coupled with said tachometer means and with said filter circuit means, and being operative for comparing the phase of said synchronizing pulses with the phase of said control signal components, said comparator circuit means being further operative to detect the phase difference of the compared signals and to produce correction signals corresponding to said phase difference, said correction circuit means further including phase shifting circuit means operably coupled with said comparator circuit means, with said filter circuit means, and with said amplifying means, said phase shifting circuit means being responsive to the receipt of said correction signals from said comparator circuit means for shifting the phase of said pulses in said train thereof.

18. An electrical circuit for controlling the operation of an electrical motor device in accordance with timing signals of the type produced by a sync-pulse generator used in a conventional television system for controlling picture image scanning, including:

detection circuit means adapted to be operably coupled with a source of said timing signals for receiving said timing signals from the latter, and operative to detect at least certain periodically recurring ones of said received timing signals comprising a train of picture synchronizing pulses each respectively associated with the commencement of scanning of a picture field by said television system, said detection circuit means including filter circuit means for selectively filtering said timing signals to detect said train of synchronizing pulses;

amplifying means adapted to be operably coupled with said motor device and operably coupled with said detection circuit means, said amplifying means being operative to receive said train of synchronizing pulses and including amplification circuit means for amplifying each of the latter to produce synchronized power signals for delivery to said motor device for energizing the latter to operate, the operating condition of said motor device being controlled in accordance with the frequency of said train of synchronizing pulses, sensing means operably associated with said motor device for sensing said operating condition of the latter, and for producing control signals corresponding to said sensed condition;

actuatable pulse generation means having an output and being operative upon actuation thereof for generating an electrical pulse having a prescribed duration at said output thereof; and digital logic circuit means having inputs thereto operably coupled with said sensing means, with said pulse generation means output, and with said detection circuit means, and having a gated output operably coupled with said amplifying means, said logic circuit means being responsive to the receipt of said pulse from said pulse generation means upon actuation of the latter for coupling said detection circuit means with said amplifying means for said pulse duration to allow delivery of said synchronizing pulse train to the latter for energizing said motor device, said logic circuit means functioning to maintain said coupling between said detection circuit means and said amplifying means after said pulse duration only so long as said control signals are being produced by said sensing means, said logic circuit means functioning to uncouple said detection circuit means from said amplifying means upon failure of said sensing means to produce said control signals after said pulse duration.

19. The invention of claim 18, wherein said digital logic circuit means includes:

a first gate circuit means having the input section thereof operably coupled with said sensing means and said pulse generation means and having an output section, and a second gate circuit means having the input section thereof operably coupled with said output of said first gate circuit means and with said detection circuit means, and having an output section operably coupled with said amplifying means, there being further provided switchable circuit means operably coupled with said output section said first gate circuit means and under control of the latter, and being adapted for operably coupling with both said motor device and a conventional source of electrical power, said first gate circuit means being operative in response to the absence of the receipt of said control signals at said input section thereof, for switching said switchable circuit means whereby to cause the latter to couple said source of electrical power with said motor device for energizing the latter.

* * * * *